(12) United States Patent
Hirayama et al.

(10) Patent No.: US 12,366,075 B2
(45) Date of Patent: Jul. 22, 2025

(54) IMPACT ABSORBING FLOORING

(71) Applicant: Magic Shields Inc., Hamamatsu (JP)

(72) Inventors: Yosuke Hirayama, Shizuoka (JP);
Hiroshi Shimomura, Shizuoka (JP);
Taiki Sugiura, Shizuoka (JP)

(73) Assignee: Magic Shields Inc., Shizuoka (JP)

( * ) Notice: Subject to any disclaimer, the term of this patent is extended or adjusted under 35 U.S.C. 154(b) by 321 days.

(21) Appl. No.: 18/060,956

(22) Filed: Dec. 1, 2022

(65) Prior Publication Data
US 2023/0096329 A1 Mar. 30, 2023

Related U.S. Application Data

(63) Continuation of application No. PCT/JP2021/039543, filed on Oct. 26, 2021.

(30) Foreign Application Priority Data

Oct. 26, 2020 (JP) .................................. 2020179264

(51) Int. Cl.
*E04F 15/22* (2006.01)
*B32B 3/14* (2006.01)
(Continued)

(52) U.S. Cl.
CPC .............. *E04F 15/225* (2013.01); *B32B 3/14* (2013.01); *E04F 15/02194* (2013.01); *B32B 5/18* (2013.01); *B32B 27/065* (2013.01); *B32B 27/30* (2013.01); *B32B 27/32* (2013.01); *B32B 2266/0235* (2013.01); *B32B 2274/00* (2013.01);
(Continued)

(58) Field of Classification Search
CPC .. E04F 15/225; B32B 5/18; B32B 2266/0235; B32B 2274/00; B32B 2307/558; B32B 2419/00
See application file for complete search history.

(56) References Cited

U.S. PATENT DOCUMENTS 3,368,806 A * 2/1968 Szonn ..................... F16F 1/422
267/153
4,879,857 A * 11/1989 Peterson ............... E04F 15/225
52/480

(Continued)

FOREIGN PATENT DOCUMENTS

CA 2369602 A1 * 7/2003 ......... A47G 27/0293
CN 116717051 A * 9/2023
(Continued)

OTHER PUBLICATIONS

International Search Report and (ISA/237) Written Opinion of the International Search Authority for International Patent Application No. PCT/JP2021/039543, mailed by the Japan Patent Office on Oct. 26, 2020.

(Continued)

*Primary Examiner* — Babajide A Demuren

(57) ABSTRACT

The present invention provides an impact absorbing flooring that reduces an impact caused by falling of a user. The impact absorbing flooring includes a structural layer having a plurality of impact absorbing structures, each of which is a truncated pyramid-shaped structure and has a recess on a side of the truncated pyramid that is substantially not horizontal to a ground surface.

15 Claims, 28 Drawing Sheets

(51) Int. Cl.
  *E04F 15/02*   (2006.01)
  *B32B 5/18*   (2006.01)
  *B32B 27/06*   (2006.01)
  *B32B 27/30*   (2006.01)
  *B32B 27/32*   (2006.01)

(52) U.S. Cl.
  CPC ..... *B32B 2307/558* (2013.01); *B32B 2419/00* (2013.01)

(56) References Cited

U.S. PATENT DOCUMENTS

| | | | |
|---|---|---|---|
| 4,890,434 A * | 1/1990 | Niese | E04F 15/225 52/480 |
| 5,277,010 A * | 1/1994 | Stephenson | E04F 15/225 52/480 |
| 5,303,526 A * | 4/1994 | Niese | E04F 15/225 52/480 |
| 5,619,832 A * | 4/1997 | Myrvold | E04F 15/20 52/630 |
| 6,029,962 A * | 2/2000 | Shorten | B29C 66/1312 267/145 |
| 7,386,957 B2 * | 6/2008 | Duffney | B09C 1/00 52/169.5 |
| 7,735,280 B2 * | 6/2010 | Valentine | F16F 1/44 52/480 |
| D685,924 S * | 7/2013 | Lee | D25/152 |
| 8,955,279 B1 * | 2/2015 | Clairmont | E04F 15/22 52/480 |
| 12,044,016 B2 * | 7/2024 | Schluter | G02B 7/003 |
| 2002/0108340 A1 * | 8/2002 | Elliott | E04F 15/225 52/480 |
| 2002/0178675 A1 * | 12/2002 | Valentine | E04F 15/225 52/480 |
| 2006/0234009 A1 | 10/2006 | Roh | |
| 2009/0211192 A1 | 8/2009 | Valentine | |
| 2014/0190103 A1 * | 7/2014 | Sawyer | E01C 13/045 52/302.1 |
| 2015/0176225 A1 * | 6/2015 | Sawyer | E04B 5/48 404/28 |
| 2017/0356517 A1 | 12/2017 | Betteridge | |
| 2018/0080235 A1 * | 3/2018 | Downey | B32B 3/30 |
| 2018/0148937 A1 * | 5/2018 | Brown | E04F 15/02183 |

FOREIGN PATENT DOCUMENTS

| | | | |
|---|---|---|---|
| JP | H0479105 U | 7/1992 | |
| JP | 2007332280 A | 12/2007 | |
| JP | 2017180496 A | 10/2017 | |
| JP | 2019525783 A | 9/2019 | |
| JP | 2019178519 A | 10/2019 | |
| KR | 20090084155 A | 8/2009 | |
| TW | 200635730 A | 10/2006 | |
| WO | WO-2018049539 A1 * | 3/2018 | B32B 3/30 |

OTHER PUBLICATIONS

Supplementary International Search Report for International Application No. PCT/JP2021/039543, mailed by the European Patent Office on Feb. 9, 2023.

Office Action issued for counterpart Taiwanese Application 110139742, transmitted from the Taiwan Intellectual Property Office on Jan. 17, 2025 (issued on Jan. 16, 2025).

* cited by examiner

IMPACT ABSORBING FLOORING

The contents of the following Japanese patent application(s) are incorporated herein by reference:
NO. 2020-179264 filed in JP on Oct. 26, 2020, and
NO. PCT/JP2021/039543 filed in WO on Oct. 26, 2021

BACKGROUND

1. Technical Field

The present invention relates to an impact absorbing flooring that absorbs impact.

2. Related Art

In recent years, mats and flooring that absorb impact have been proposed in order to prevent injury when a patient, an elderly person, or the like falls.

Patent Document 1 discloses a flooring having a simple composition, securing excellent impact absorption performance and caster traveling performance, and further having excellent walking performance.

Patent Document 2 discloses a system for attenuating applied force and absorbing impact energy.

PRIOR ART DOCUMENT

Patent Document

Patent Document 1: Japanese Patent Application Publication No. 2019-178519
Patent Document 2: Japanese Translation of PCT International Patent Application No. 2019-525783

DESCRIPTION OF EXEMPLARY EMBODIMENTS

The contents of the embodiments of the present invention will be listed and described. The present invention has the following configuration.

(Item 1)

An impact absorbing flooring that reduces an impact caused by falling of a user, the impact absorbing flooring including:
a structural layer having a plurality of impact absorbing structures, each of which has a truncated pyramid-shaped structure and has a recess on a side of the truncated pyramid that is not substantially horizontal to a ground surface.

(Item 2)

The impact absorbing flooring according to item 1, wherein a deepest portion of the recess is in a section including both ends of second to fourth sections from above when a height of each of the impact absorbing structures is divided into four equal parts.

(Item 3)

The impact absorbing flooring according to claim 1 or 2, wherein the structural layer is formed by causing a plurality of units to be adjacent to each other, wherein each of the plurality of units comprises two or more of the impact absorbing structures adjacently disposed on one side.

(Item 4)

The impact absorbing flooring according to item 3, further including:
a coupling body configured to couple a plurality of the units.

(Item 5)

The impact absorbing flooring according to item 4, wherein
the coupling body is configured to simultaneously touch a plurality of the impact absorbing structures respectively existing in a plurality of the units which are adjacent to each other.

(Item 6)

The impact absorbing flooring according to any one of items 1 to 5, further including, on top of the structural layer:

an upper layer containing a hard material that enhances a walking performance of the user; and an intermediate layer made of an impact buffering material.

Details of Embodiments

Hereinafter, embodiments of the present invention will be described with reference to the drawings.
(Overview)

Figure 1:
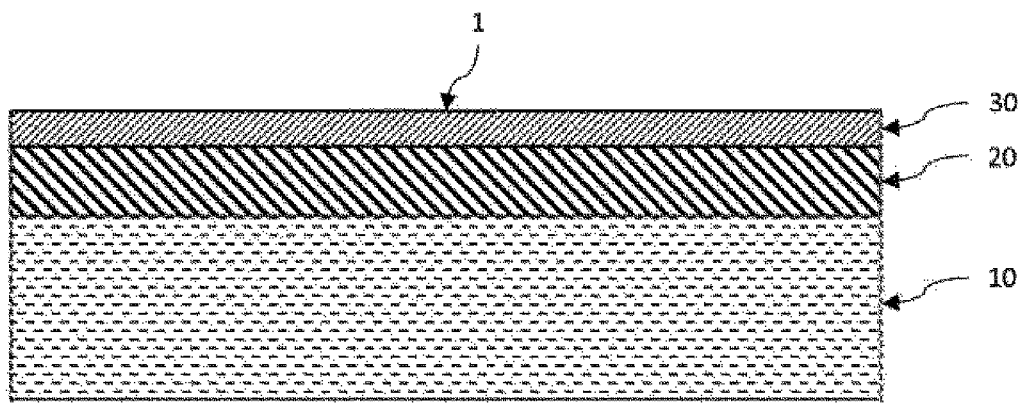
FIG. 1 is a diagram illustrating an overall image of a flooring system 1.

A flooring system 1 according to an embodiment of the present invention includes a plurality of layers having different functions. FIG. 1 is a diagram of a part of the flooring system 1 as viewed from a side as an example, and illustrates three basic components of the flooring system 1.

The flooring system 1 of the present embodiment includes a structural layer 10 having a main function of absorbing impact, an intermediate layer 20 having an effect of leveling unevenness of the structural layer 10, and an upper layer 30 having a basic function as a floor such as decorativeness, slipperiness, waterproofness, and friction resistance and enhancing walking performance.

Figure 2:
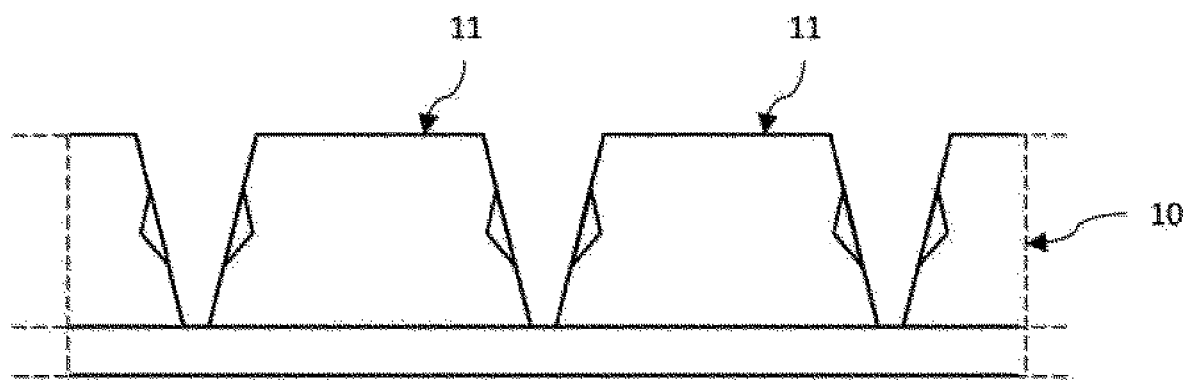
FIG. 2 is a diagram of a structural layer 10 as viewed from a side.

As an example, the structural layer 10 of the present embodiment forms a lower layer of the flooring system 1 and has a structure as illustrated in FIG. 2. FIG. 2 is a diagram of the structural layer 10 as viewed from a side as an example. The structural layer 10 is characterized in that a novel structure body 11 having impact absorbing ability is a basic unit, and a plurality of structure bodies 11 is provided at adjacent positions.

The structure and function of the structure body 11 of the present embodiment will be described.

Figure 3A:
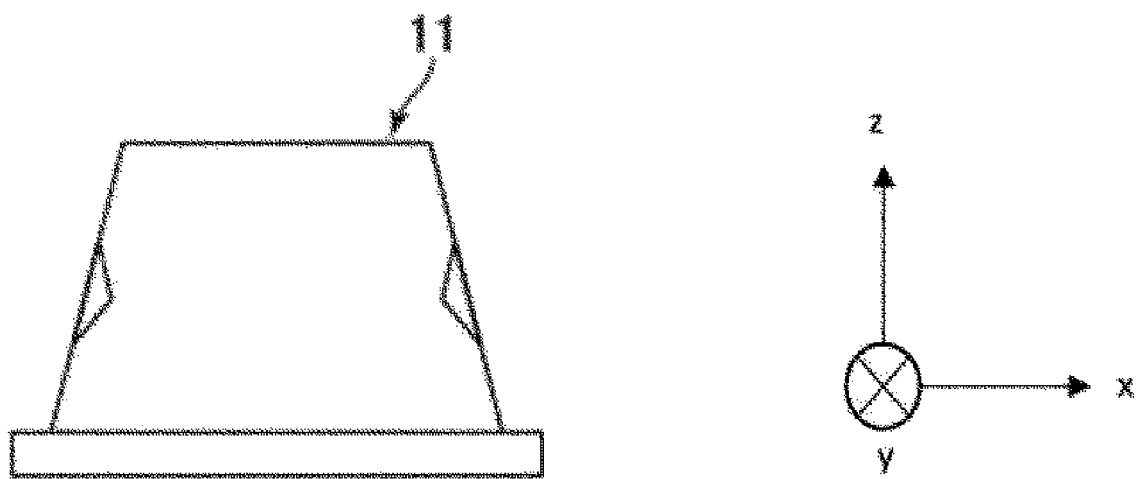
FIG. 3A is a diagram of a structure body 11 as viewed directly from a side.
Figure 3B:
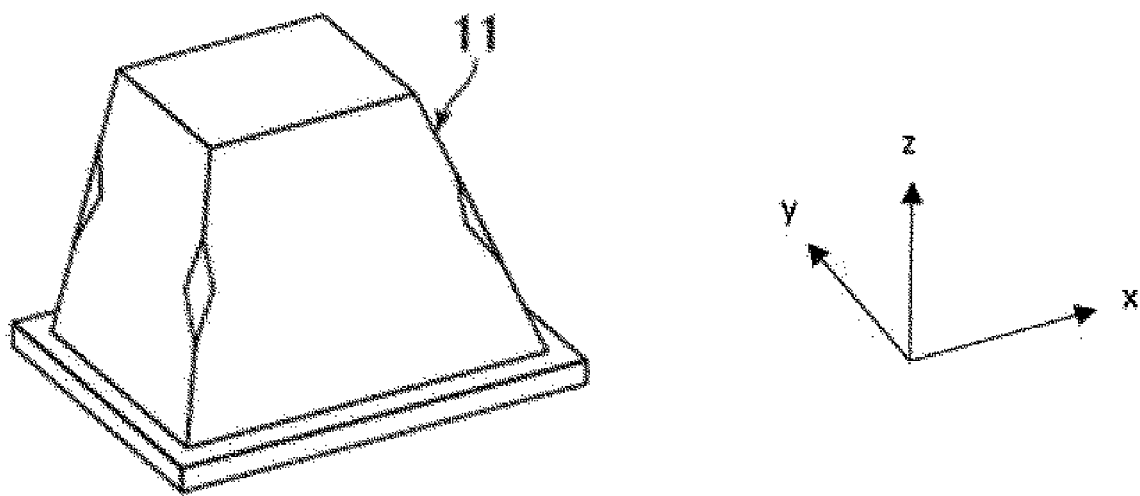
FIG. 3B is a diagram of the structure body 11 as viewed obliquely from above.
Figure 3C:
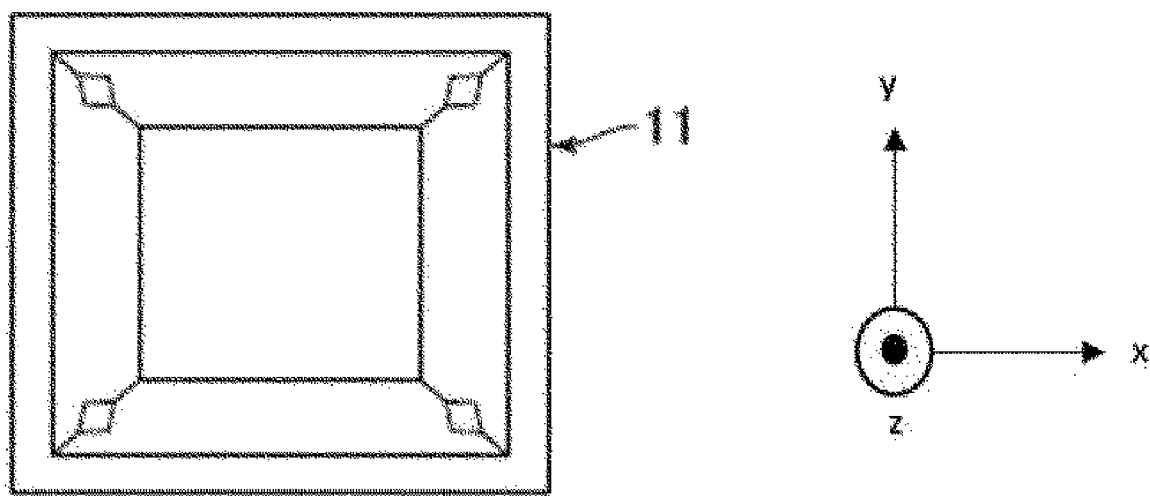
FIG. 3C is a diagram of the structure body 11 as viewed directly from above.
Figure 3D:
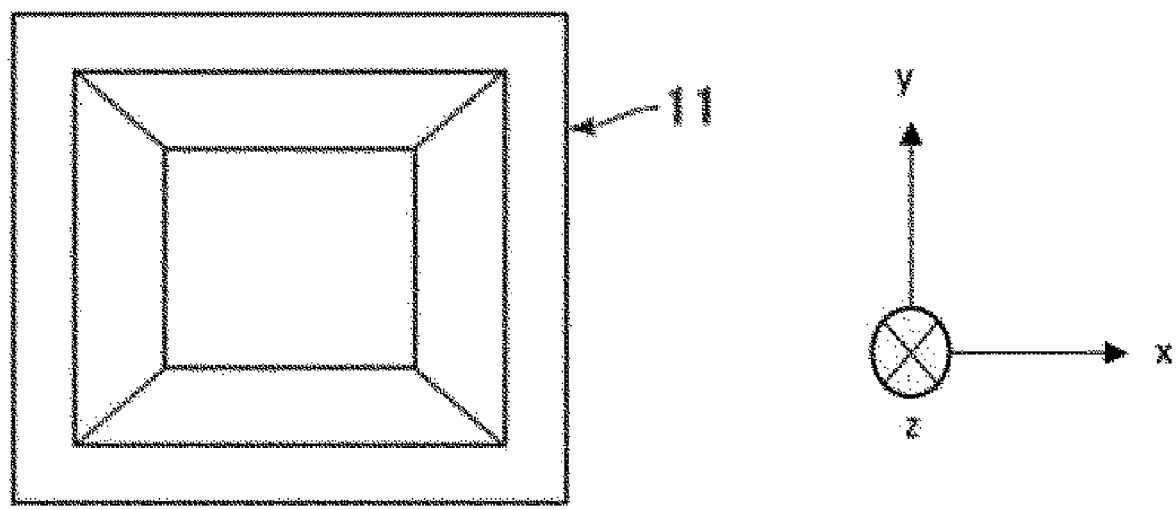
FIG. 3D is a diagram of the structure body 11 as viewed directly from below.

As an example, the structure body 11 of the present embodiment is based on a frustum-shaped structure. An example of the structure of the structure body 11 is illustrated in FIGS. 3A to 3D. FIG. 3A is a diagram of the structure body 11 as viewed directly from a side. FIG. 3B is a diagram of the structure body 11 as viewed obliquely from above. FIG. 3C is a diagram of the structure body 11 as viewed directly from above. FIG. 3D is a diagram of the structure body 11 as viewed directly from below.

Figure 4:
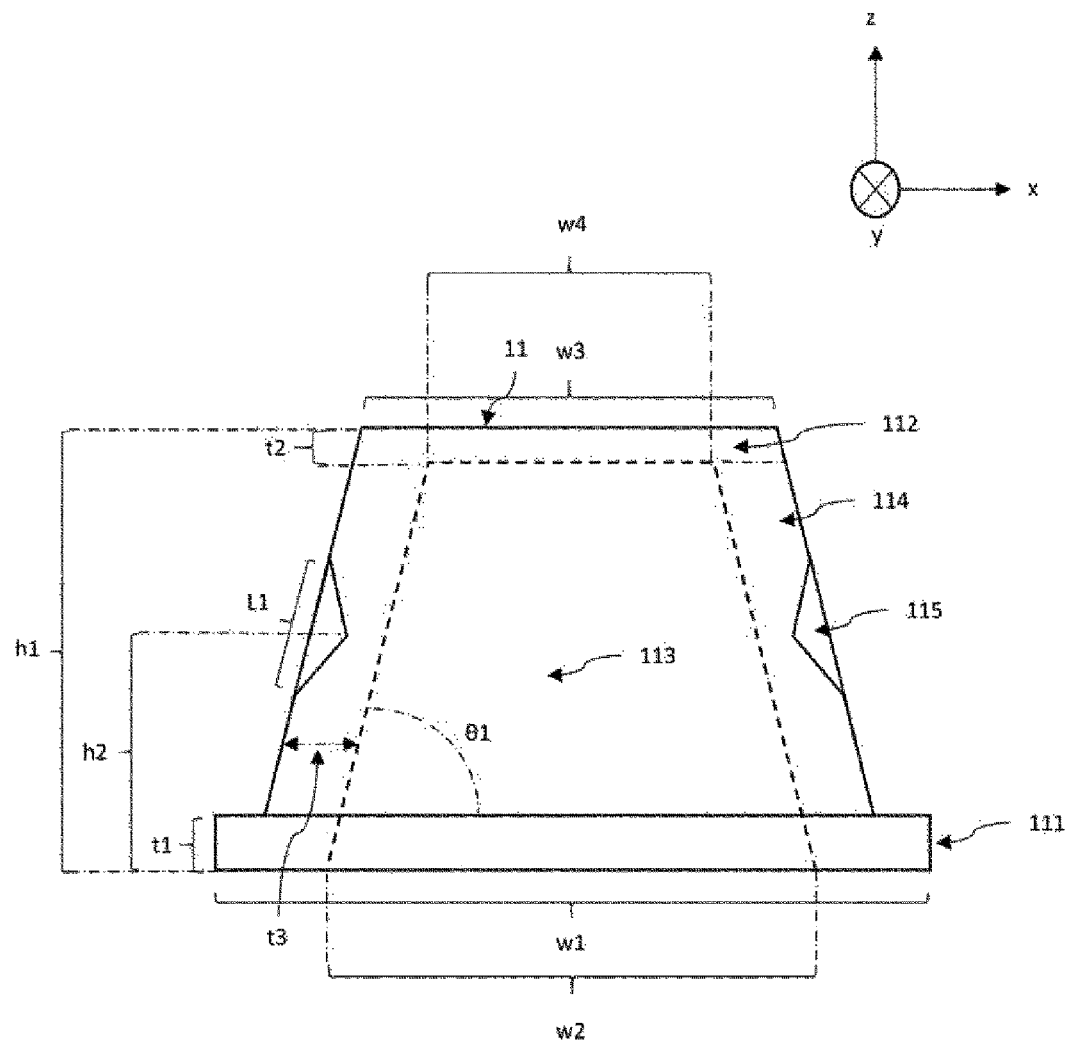
FIG. 4 is another diagram illustrating an example of the structure of the structure body 11.

FIG. 4 is a diagram of the structure body 11 as viewed from a side, and a line invisible from the surface is indicated by a broken line. In addition, an auxiliary line for use in the description is indicated by a one-dot broken line, and the length and the position of the angle (the auxiliary line is indicated by a one-dot broken line) of each part are indicated. Note that, in FIGS. 3A to 3D, an example of the structure body 11 of the present embodiment is described as a quadrangular truncated pyramid having a square bottom surface, but a frustum-shaped structure having another polygonal bottom surface may be used. In particular, a hexagonal truncated pyramid having a hexagonal bottom surface, which is known to have constant rigidity in all directions on a horizontal plane, is even better.

Each portion of the structure body 11 of the present embodiment will be described with reference to FIG. 4. The structure body 11 includes an installation portion 111 which is a portion in contact with a structure such as a floor, the ground, or the like and is substantially parallel to a portion to which the installation portion is installed, an upper surface portion 112 which is a portion receiving a load when a person walks and is substantially parallel to the installation portion 111, a wall surface portion 113 constituting a wall surface of the frustum, a column portion 114 which is a portion serving as a column connecting each corner of the square of the installation portion 111 and each corner of the corresponding upper surface portion 112, and a concave portion 115 existing in the column portion 114. Note that the wall surface portion 113 is not essential as long as the installation portion 111 and the upper surface portion 112 are connected by the column portion 114. Although the installation portion 111, the upper surface portion 112, the wall surface portion 113, and the column portion 114 are described as separate parts, since the structure body 11 is assumed to be manufactured integrally, the respective contact points of the installation portion 111, the upper surface portion 112, the wall surface portion 113, and the column portion 114 are integrally connected, but may be manufactured as separate parts and connected by an adhesive or a component to form the structure body 11.

Figure 15:
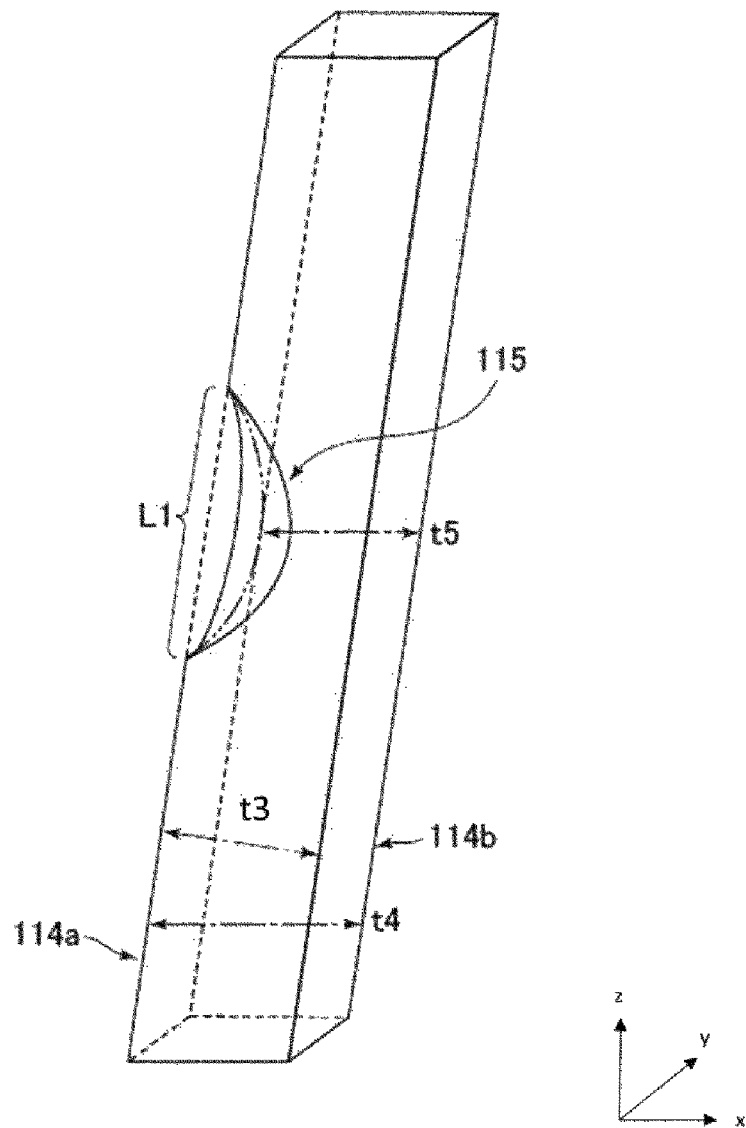
FIG. 15 is a diagram illustrating the structure of the column portion 114 of the structure body 11a used in an example.

Each portion of the structure body 11 of the present embodiment is defined in FIG. 4. In FIG. 4, the height of the structure body 11 is a height h1. The installation portion 111 has a width w1 and a thickness t1. The upper surface of the upper surface portion 112 has a width w3 and a thickness t2. The wall surface portion 113 and the column portion 114 have a thickness t3. The length from the lowermost portion of the installation portion 111 to the deepest portion of the recess of the concave portion 115 (in FIG. 7, the contact point between the plane passing through the extension line of a side 114a and a side 114b and the plane constituting the recess of the concave portion 115 is indicated by a two-dot chain line, and the deepest portion indicates a position where a straight line drawn perpendicularly to the two-dot chain line from the extension line of the side 114a is the longest. The same applies to FIG. 15) is a height h2, and the width of the concave portion 115 is a width L1. The length of the inner side of the bottom surface of the installation portion 111 is defined as a width w2. The column portion 114 is basically a quadrangular column having a square with one side having a width t3, but is not limited thereto, and a place in contact with the installation portion 111 and the intermediate layer 20 has a structure scraped substantially in parallel. In FIG. 4, an angle formed by the installation portion 111 and the column portion 114 is defined as θ1.

Figure 6A:
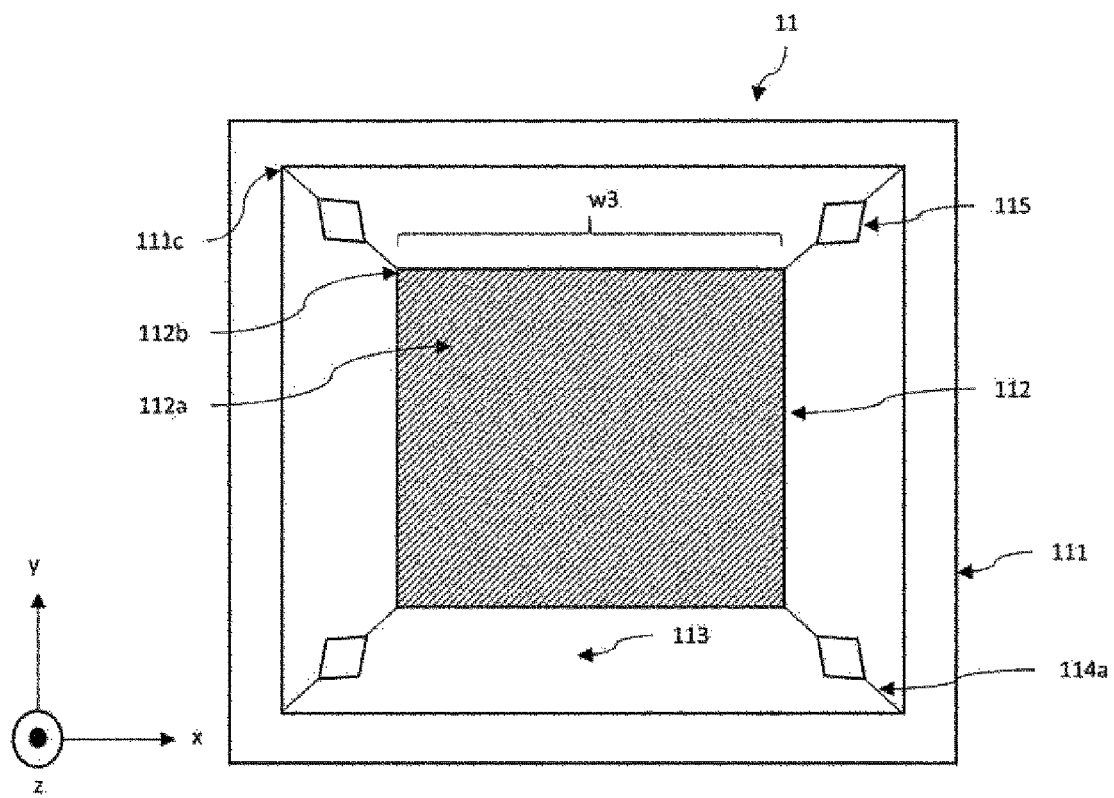
FIG. 6A is a diagram of the structure body 11 as viewed from above.
Figure 6B:
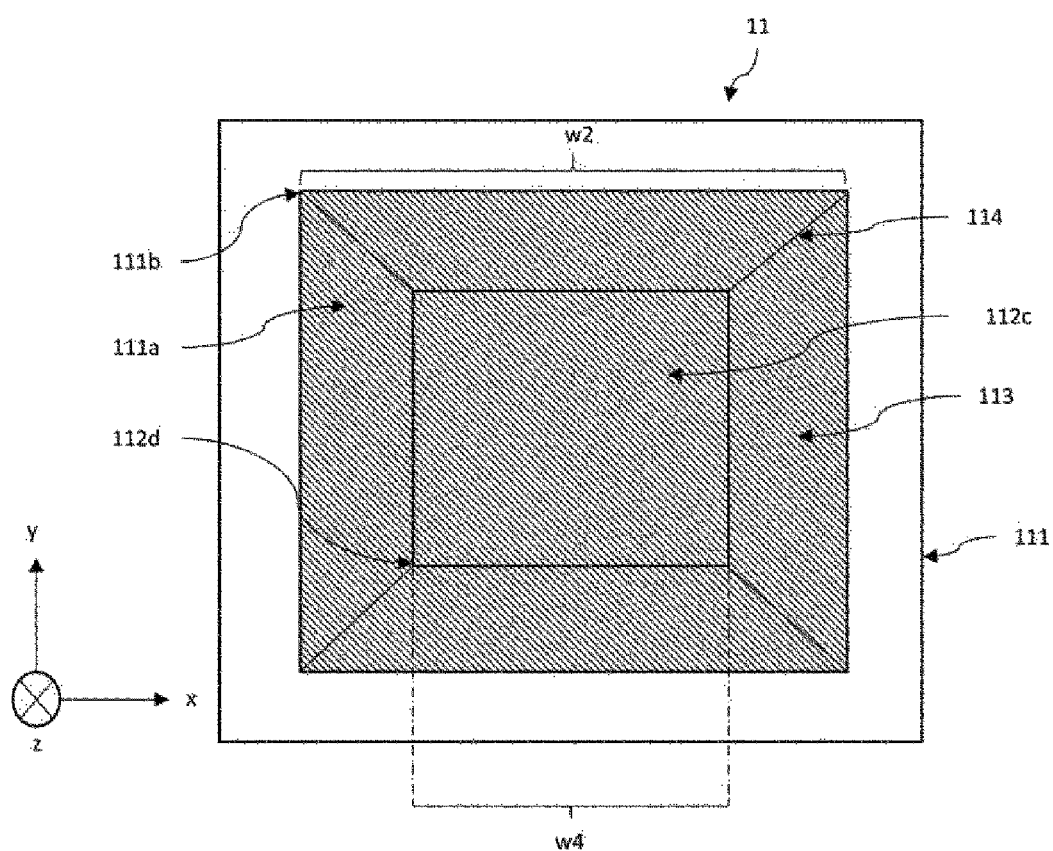
FIG. 6B is a diagram of the structure body 11 as viewed from below.
Figure 7:
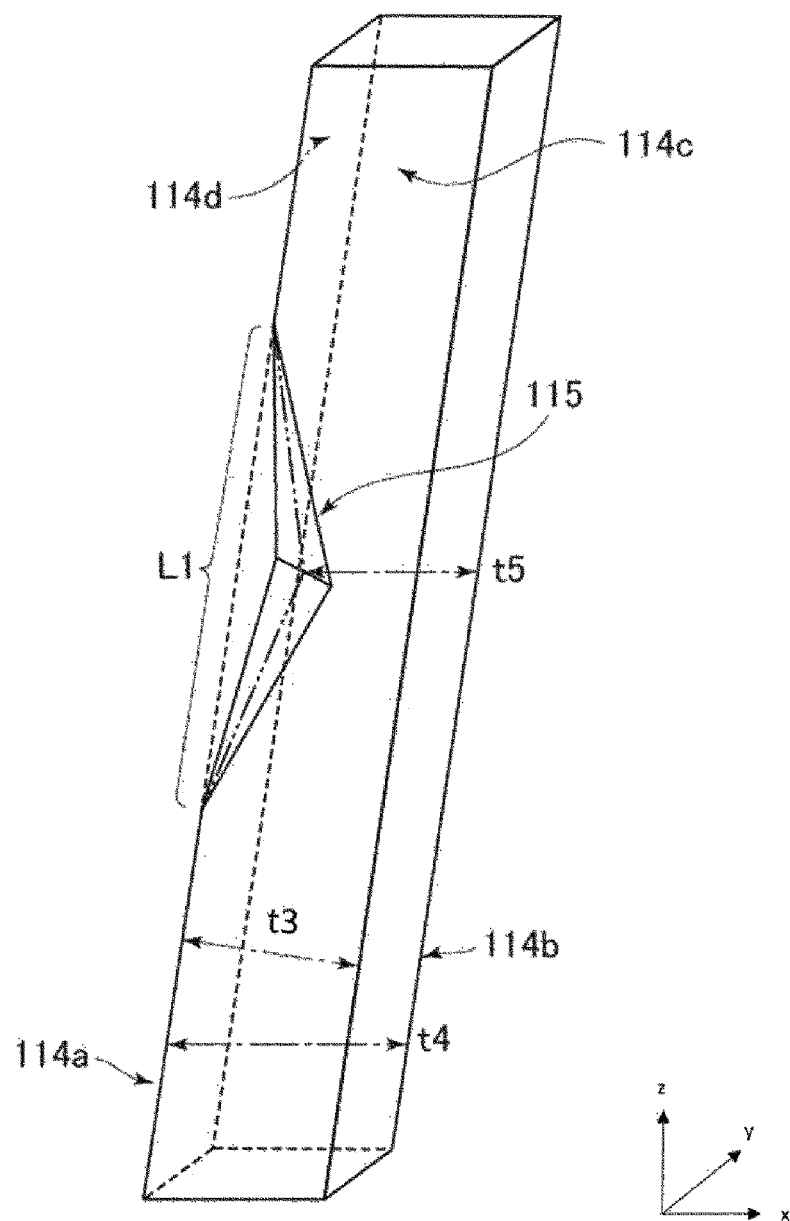
FIG. 7 is a diagram illustrating a structure of a column portion 114.

The column portion 114 of the structure body 11 of the present embodiment is further defined based on FIG. 7. FIG. 7 is a diagram illustrating the column portion 114 of the present embodiment. The width of the concave portion 115 is a width L1. A side of a corner side (a side extending from the corner of the upper surface portion 112 (for example, 112b in FIGS. 6A and 6B) toward the installation portion 111 (for example, 111c in FIGS. 6A and 6B)) of the column portion 114 below the concave portion 115 is defined as a side 114a, and a side of a corner side of the column portion 114 inside the concave portion 115 is defined as a side 114b. At this time, a line at an equal distance to a side surface 114c and a side surface 114d facing the outside of the column portion 114 and drawn perpendicularly to the side 114b from an arbitrary point of the side 114a corresponds to the thickness of the column portion 114, and this length is defined as a thickness t4. A length of a line perpendicularly drawn from the deepest portion of the concave portion 115 to the side 114a is defined as a thickness t5.

The installation portion 111 of the present embodiment is substantially parallel to the portion to be installed and is in contact with the portion to be installed. The portion to be installed is assumed to be a floor slab, a floor on which flooring, vinyl chloride, or the like is applied, a structure such as a floor on which an OA floor or the like is installed, or a floor plate, a place on top of which a tatami mat or the like is installed, a ground, or the like in the case of wood, but is not limited thereto as long as it is a place where a person walks. Note that, in FIGS. 3A to 3D, the installation portion 111 of the present example is described as having only the frame portion. However, as long as a gap is provided in the upper surface portion 112 or the wall surface portion 113, and the air escapes so that the structure body 11 can be deformed when a load is applied to the upper surface portion 112, the installation portion 111 may close the bottom of the structure body 11, or a gap may be provided in a part so that the air escapes.

In addition, in order to prevent the structural layer unit 12 (to be described in detail later) from being displaced after installation, measures may be taken such as providing unevenness on the bottom surface of the installation portion 111 and attaching an adhesive material such as a double-sided seal to increase the frictional force with the portion to be installed. Note that the structure body 11 is integrally manufactured so as to be connected to another adjacent structure body 11 at the installation portion 111, and the structural layer unit 12 including the plurality of structure bodies 11 is formed. However, the structural layer unit 12 may be formed by bonding or connecting by parts the structure bodies 11 to each other after being manufactured separately.

In the installation portion 111 of the present embodiment, the width w1 may be 5 mm or more; if the width w1 is 10 mm or more, the manufacturing cost can be kept low; if the width w1 is 20 mm or more, the installation portion 111 can be kept within the height h1 that is easy to apply; and if the width w1 is 25 mm or more, impact absorption can be performed by the four structure bodies 11 on average and the function of preventing fracture is enhanced no matter which portion of the structural layer unit 12 the trochanter portion of the femur is struck against. The width w1 may be 100 mm or less; if the width w1 is 80 mm or less, the manufacturing cost can be kept low; if the width w1 is 50 mm or less, the installation portion 111 can be kept within the height h1 that is easy to apply; and if the width w1 is 35 mm or less, impact absorption can be performed by the four structure bodies 11 on average and the function of preventing fracture is enhanced no matter which portion of the structural layer unit 12 the trochanter portion of the femur is struck against.

The upper surface portion 112 of the present embodiment is substantially parallel to the installation portion 111, and is a portion that directly receives a load through the upper layer 30 and the intermediate layer 20 when the load is applied thereto from above by walking or the like, by overlapping the intermediate layer 20 and the upper layer 30 on top of the upper surface portion 112. In FIGS. 3A to 3D, the upper surface portion 112 is described so as not to have unevenness. However, as long as the intermediate layer 20 and the upper layer 30 are overlapped on top of the upper surface portion 112, the upper surface portion 112 may be designed such that unevenness and holes exist, and the air inside escape from the gap when the structure body 11 is deformed.

Figure 5:
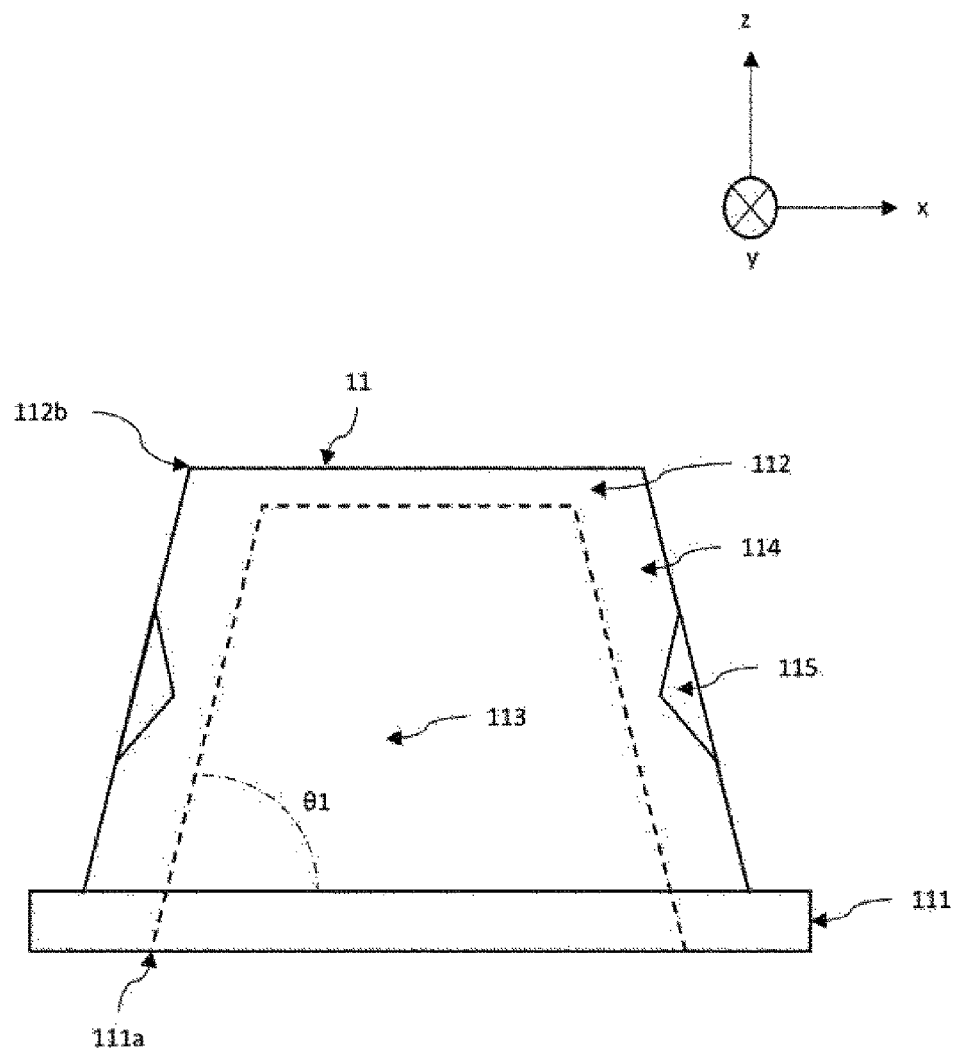
FIG. 5 is another diagram illustrating an example of the structure of the structure body 11.

FIG. 5 is a diagram of the structure body 11 as viewed from a side, FIG. 6A is a diagram of the structure body 11 as viewed from above, and FIG. 6B is a diagram of the structure body 11 as viewed from below. Here, an upper surface (referred to as a surface 112a) of the upper surface portion 112 indicated by hatching in FIG. 6A is a square having a width w3 on one side, and a point at a corner thereof is a point 112b. In FIG. 6B, the lower surface (a quadrangle at the center in the drawing; referred to as a surface 112c) of the upper surface portion 112 is a square having a width w4 (assuming that a corner of the lower surface of the upper surface portion 112 is a point 112d, a length to another corner of the surface 112c adjacent to the point 112d is a width w4) on one side. The inside of the bottom surface of the installation portion 111 indicated by hatching in FIG. 6B (referred to as a surface 111a) is a square having a width w2 (assuming that a corner inside the installation portion 111 is a point 111b, a length to another corner of the surface 111a adjacent to the point 111b is a width w2) on one side. At this time, in order to exhibit the ability of impact absorption, the relationship of Expression 1 is established. When no load is applied to the structure body 11, the surface 112c appears to exist inside the surface 111a when viewed from above.

Width $w4$ < Width $w2$ (Expression 1)

$\theta 1$ may be a range in which Expression 1 is established, and when $\theta 1$ is 80 degrees or more and less than 90 degrees, high impact absorption performance of the structure body 11 is exhibited, and when $\theta 1$ ranges from 83 degrees to 87 degrees, the angle formed by the line perpendicularly lowered from the knee during walking and the line connecting the knee and the heel is about 5 degrees (Non-Patent Document 1), so that the structure stability of the structure body 11 can be accurately secured against the impact force due to walking.

Non-Patent Document 1: "Walking Analysis by Observation" translated by Kirsten GOetz-Neumann, Keiichi Tsukishiro, Sumiko Yamamoto, Yoshihiro Ebara, and Yasuhiko Hatanaka, Igaku Shoin, 2005

Note that, as in the structure body 11 of an embodiment described later, each portion illustrated in FIGS. 3A to 8D has an arc-shaped curved surface, and for example, the surface 111a, the surface 112a, and the surface 112c may not have a square shape. In that case, for example, each side of the surface 111a may be extended, and an intersection thereof may be regarded as the point 111b. Similarly, the point 112b and the point 112d may be regarded as the point which is the intersection obtained by extending each side of each surface.

The wall surface portion 113 of the present embodiment constitutes four wall surfaces of a truncated pyramid which are not horizontal to the ground. The wall surface portion 113 is a portion to which a load applied to the upper surface portion 112 is applied, but the wall surface portion 113 is not essential as long as the corresponding corners of the installation portion 111 and the upper surface portion 112 are connected by the column portions 114 and the column portions 114 have sufficient strength to receive the load.

The column portions 114 of the present embodiment connect the installation portion 111 and the respective corners of the upper surface portion 112. In the upper portion of the side 114a, the concave portion 115 exists in a form in which a part of the column portion 114 is lacked.

The concave portion 115 of the present embodiment is a portion that exists in the column portion 114 and serves as a main function in impact absorption. As illustrated in FIG. 7, since the concave portion 115 exists, the thickness of the periphery of the concave portion 115 is thin in the column portion 114. Therefore, when a certain load is applied to the upper surface portion 112, the column portion 114 is bent toward the inside of the structure body 11 at the portion of the concave portion 115.

As illustrated in FIG. 7, the portion (deepest portion) at which the recess of the concave portion 115 of the present embodiment is the deepest exists near the center of the concave portion 115. A portion indicated by a two-dot broken line in FIG. 7 is a portion where a surface passing through the side 114a and the side 114b is in contact with the concave portion 115, and the deepest portion of the concave portion 115 exists on the two-dot broken line. When a length of a line drawn perpendicularly to the side 114a and the side 114b is defined as a thickness t4, and a length of a line drawn perpendicularly to the side 114b from the deepest portion of the concave portion 115 is defined as a thickness t5, Expression 2 is established.

$$\text{Thickness } t5 < \text{Thickness } t4 \qquad \text{(Expression 2)}$$

In FIG. 4, the distance from the bottom surface of the installation portion 111 to the deepest portion of the concave portion 115 of the present embodiment has been set to the height h2, but Expression 3 is established. That is, the deepest portion of the concave portion 115 exists at a half of the height of the structure body 11 and at a position lower than the half. As a result, when a certain load is applied to the upper surface portion 112, the column portion 114 is easily bent toward the inside of the structure body 11 at the portion of the concave portion 115.

$$\text{Height } h2 \leq \text{Height } h1/2 \qquad \text{(Expression 3)}$$

Note that the deepest portion of the concave portion 115 may exist in a section including both ends of the second section from below when the height h1 is divided into four equal parts. In this case, since a distance from the deepest portion of the concave portion 115 to both upper and lower ends of the column portion 114 is sufficiently taken, the structure body 11 sinks sufficiently at the time of bending and is likely to absorb impact. When the height h1 is divided into four equal parts, the deepest portion of the concave portion 115 may exist in a section including the upper end of the second section from above. In this case, similarly to the above, a distance from the deepest portion of the concave portion 115 to both upper and lower ends of the column portion 114 can be sufficiently taken, so that the structure body 11 sinks sufficiently at the time of bending and is likely to absorb impact.

Figure 8A:
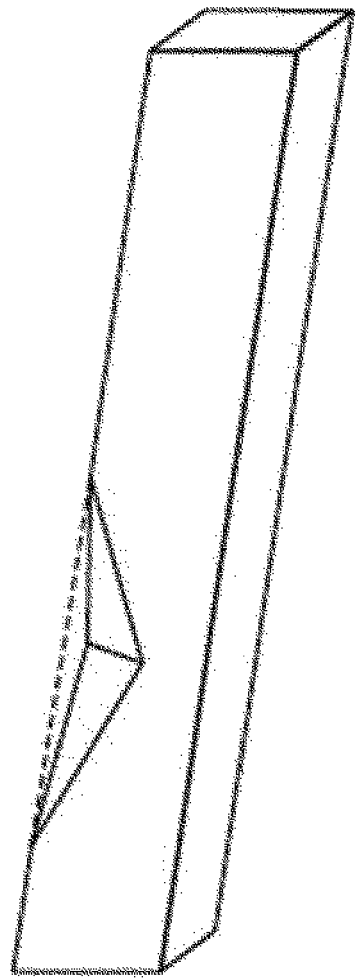
FIG. 8A is a diagram illustrating an example of a shape of a concave portion 115.
Figure 8B:
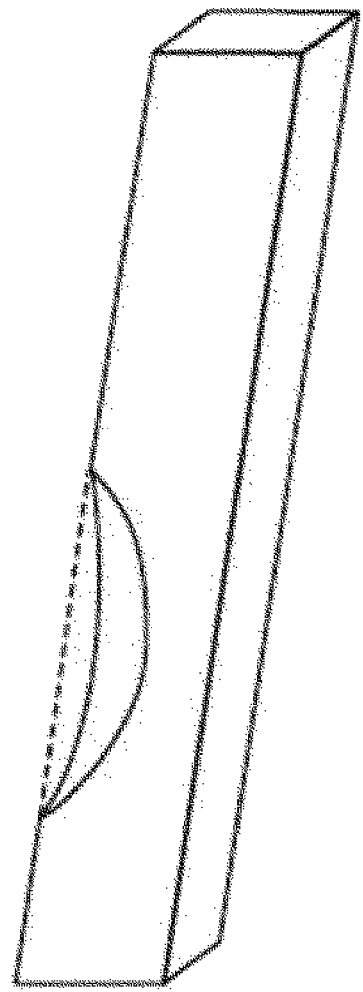
FIG. 8B is a diagram illustrating an example of a shape of a concave portion 115.
Figure 8C:
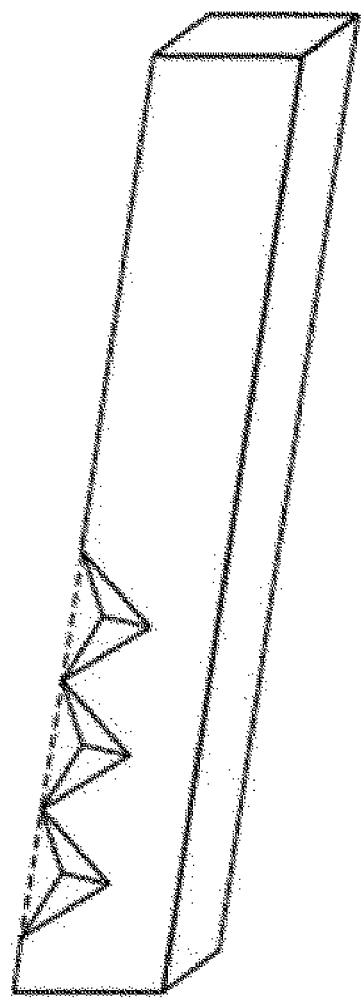
FIG. 8C is a diagram illustrating an example of a shape of a concave portion 115.
Figure 8D:
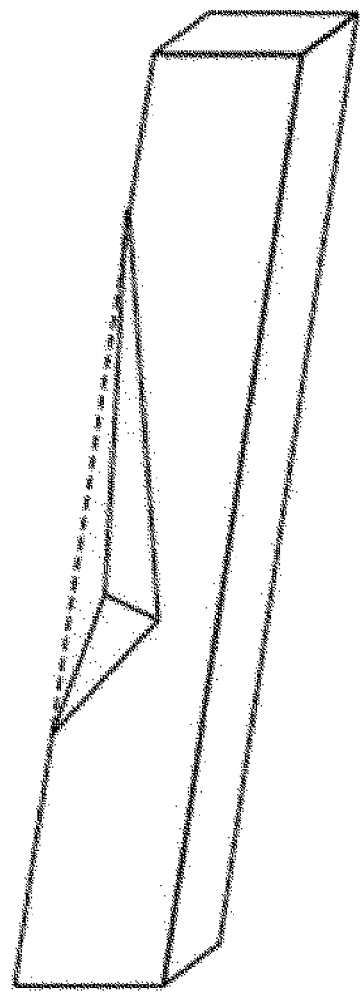
FIG. 8D is a diagram illustrating an example of a shape of a concave portion 115.

As illustrated in FIGS. 8A to 8D, the concave portion 115 may have a linearly cut shape (FIG. 8A) or a curved cut shape (FIG. 8B). Several concave shapes (FIG. 8C) may exist in the concave portion 115. Note that even when a plurality of concave shapes exists, Expression 3 is established at the deepest portion of the uppermost concave shape among them. The concave shape may not be symmetrical in the vertical direction (FIG. 8D). Although not illustrated, the concave shape may not be symmetrical in the left-right direction.

The deepest portion of the concave portion 115 may not be one point, may be plural, or may be continuous. Note that when there are a plurality of deepest portions of the concave portion 115 continuously, the deepest portions targeted in [0038], [0039], [0040], and [0050] refer to the deepest point on the uppermost side among them.

Since the structure body 11 is made of a resilient material, it can return to its original shape when the load is removed after receiving the load. The material is made of, as an example, an elastomer-based material, a sponge, or the like, and may be made of, for example, NR rubber. When the structure body 11 is made of NR rubber, the rubber hardness may be within the range of 10 to 100, and the balance between the impact absorbing ability and the stability during walking is enhanced within the range of 50 to 80.

Note that the structure body 11 of the present embodiment illustrated in FIGS. 3A to 8D may not be entirely formed of straight lines as a modification. For example, each portion described as linearly may be drawn as an arc. As a result, when there is no point or side used for the description, a straight line defining the point or side may be extended, and an intersection thereof may be regarded as the point or side.

Figure 9:
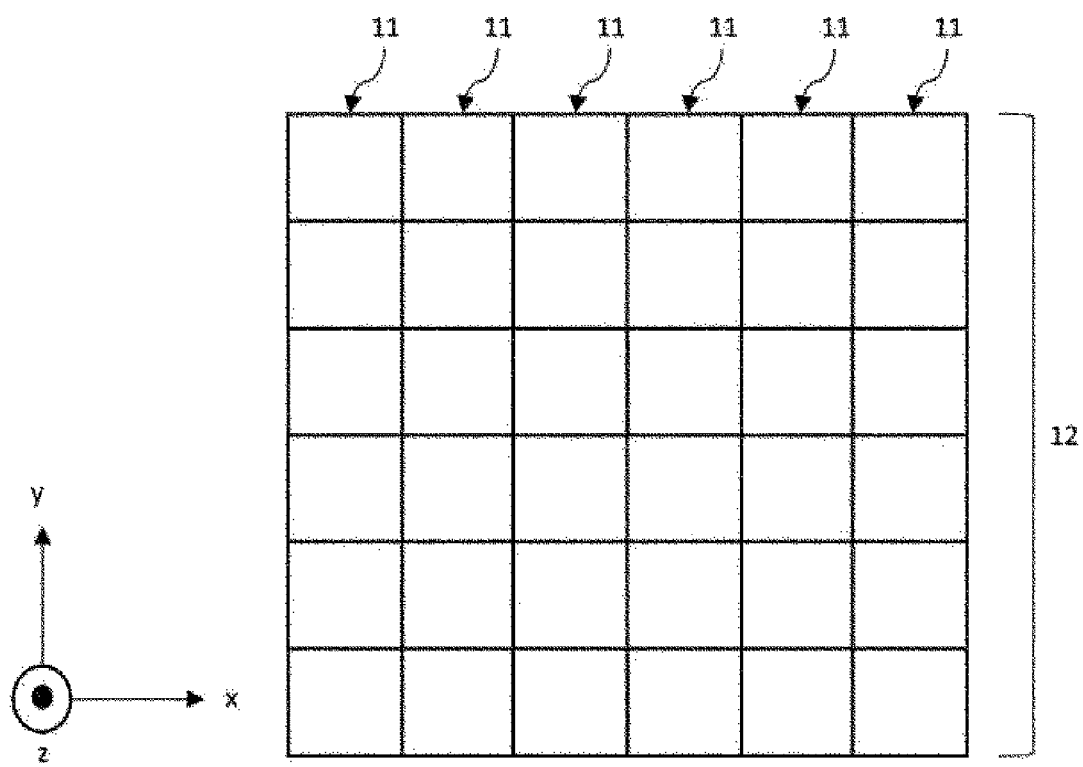
FIG. 9 is a diagram illustrating an example of a structure of a structural layer unit 12.

FIG. 9 is a diagram of the structural layer 10 of the present embodiment as viewed from above as an example. As an example, the structural layer 10 of the present embodiment is unitized in a square shape in which a plurality of structure bodies 11 are arranged side by side on one side as illustrated in FIG. 9, and the unit (referred to as a structural layer unit 12) is used by being laid on a structure body such as a floor or the ground.

Figure 10:
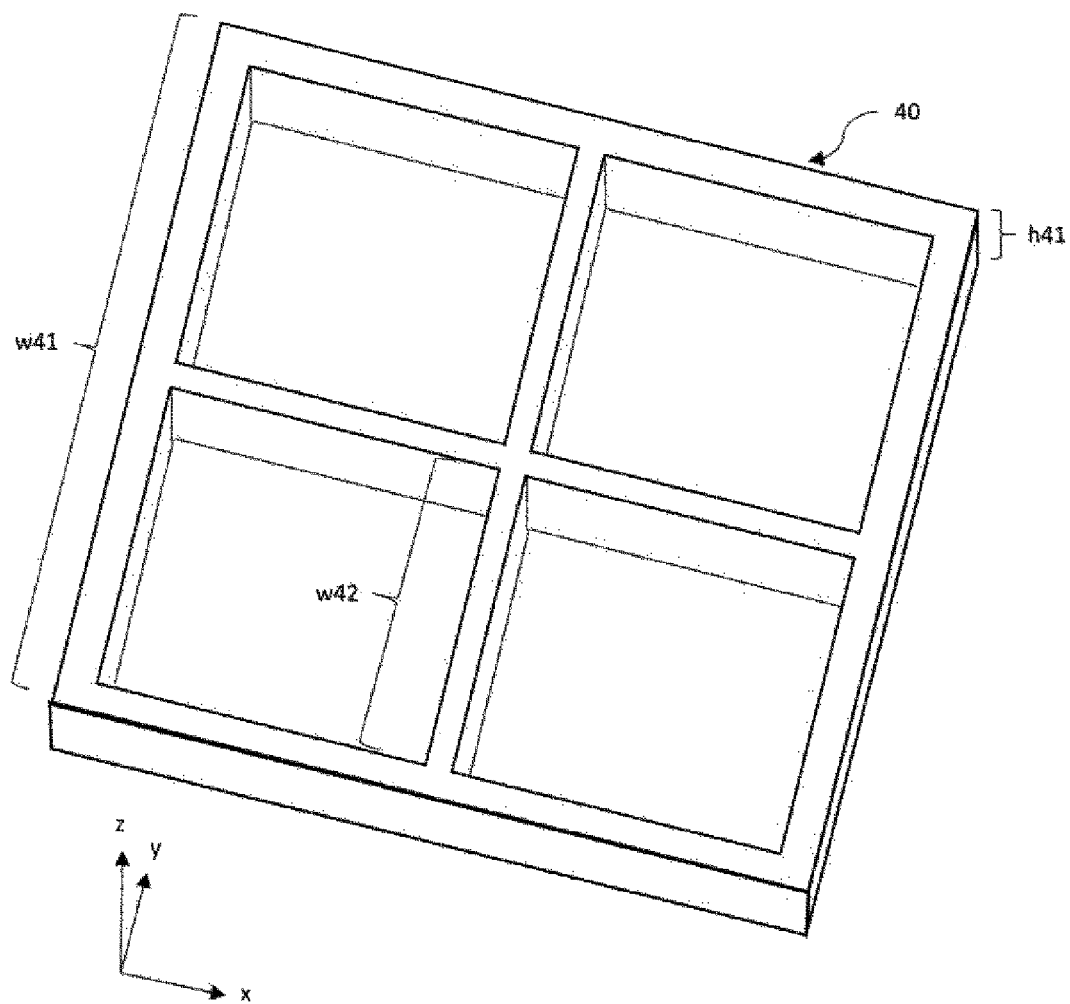
FIG. 10 is a diagram illustrating an example of a structure of a coupling body 40.

As an example, the structural layer units 12 may be coupled by using a coupling body 40 illustrated in an example in FIG. 10 in order to prevent misalignment after installation and to exhibit a certain impact absorbing ability regardless of the site even when the structural layer units 12 are laid. The coupling body 40 is structured to be fitted into respective one or more structure bodies 11 existing in different structural layer units 12. As a result, the coupling body 40 can distribute the force horizontally applied to the structure body 11 forming a certain structural layer unit 12 to the structure body 11 forming another adjacent structural layer unit 12.

Note that, in the structural layer unit 12, since the plurality of structural layer units 12 are coupled by the coupling body 40, it is sufficient that the number of structure bodies 11 arranged side by side on one side is two or more. When the number of structure bodies is five or more, it leads to a reduction in manufacturing and installation costs, and when the number of structure bodies is ten or more, it leads to a reduction in manufacturing and installation costs further.

Figure 11:
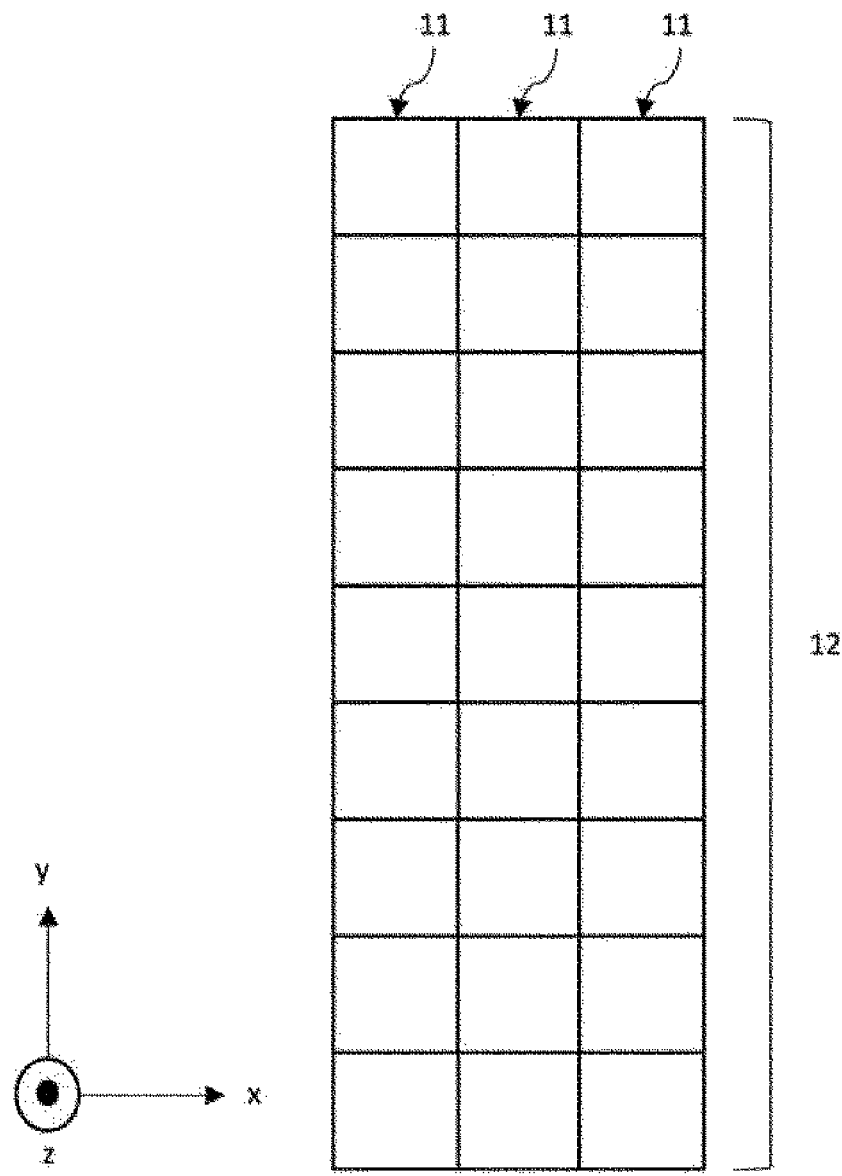
FIG. 11 is another diagram illustrating an example of the structure of the structural layer unit 12.
Figure 12:
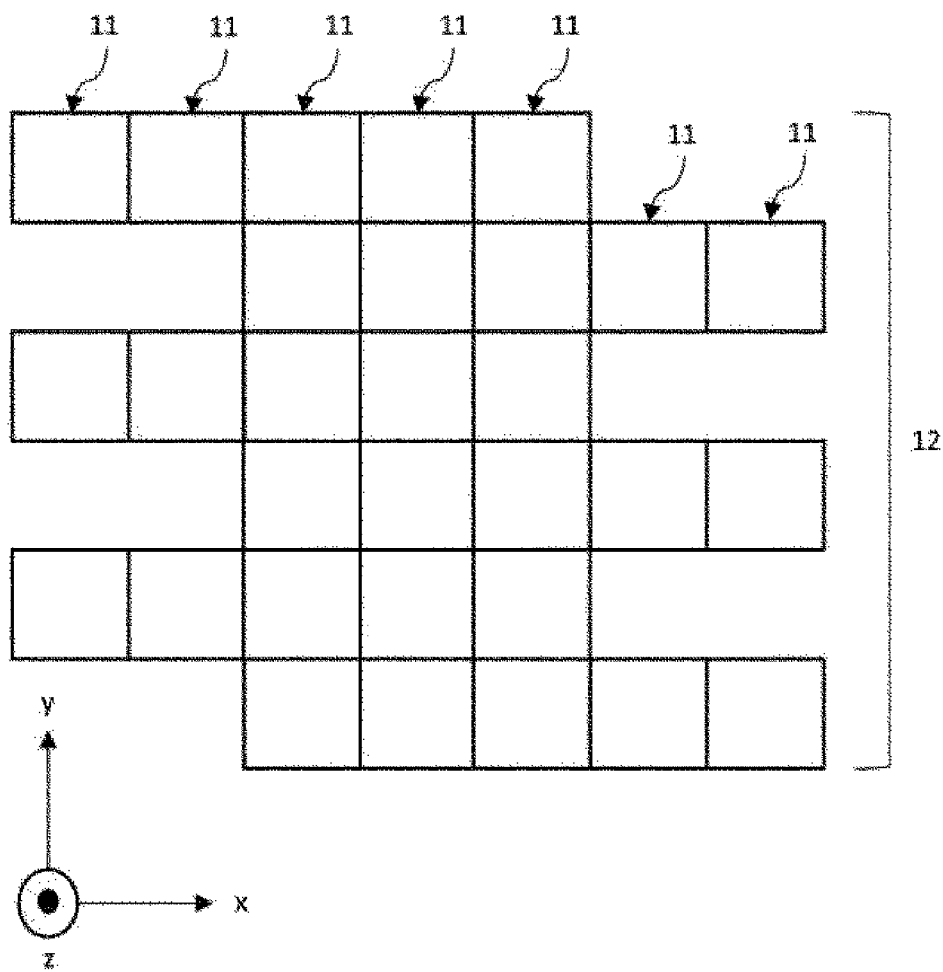
FIG. 12 is another diagram illustrating an example of the structure of the structural layer unit 12.

In the structural layer unit 12, as illustrated in FIG. 11, a rectangular shape may be formed by changing the number of structure bodies 11 arranged side by side on each side in accordance with the shape of the place where the structural layer unit is installed. In order to more firmly couple the units to each other, as illustrated in FIG. 12, several structure bodies 11 may be further arranged side by side on each side of a square or a rectangle, and unevenness may be fitted to adjacent units. At the time of laying, the structural layer units 12 exemplified in FIG. 9, FIG. 11, and FIG. 12 may be combined, or only one type may be used.

In the structural layer unit 12, all the structure bodies 11 to be arranged side by side may have the same structure and material (the same within a range of variation in manufacturing), or the structure bodies 11 having different impact absorbing abilities may be arranged side by side by changing the structure and material. The structural layer unit 12 may be configured such that the structure bodies 11 are disposed every other row, and another impact absorber such as a sponge is used for the protruding portion.

The number of structural layer units 12 to be coupled may be changed depending on the purpose. For example, a certain area in the vicinity including a place where falling is likely to occur may be covered, for example, by laying the unit over a certain area of the bedside in order to prevent a bone fracture or the like due to falling occurring at the time of getting up or getting into the bed. For example, it may be laid all over a room, a corridor, a staircase, and the like.

The structural layer unit 12 may be installed in an inverted state opposite to the direction described above. In this case, the installation portion 111 is in contact with the intermediate layer 20, and the upper surface portion 112 is in contact with the floor or the like. In this case, the height of the deepest portion of the concave portion 115 in the structure body 11 includes the height of half of the height h1 of the structure body 11 and is located lower than the height of half of the height h1 so as to approach the upper surface portion 112 in contact with the ground. Alternatively, when the height h1 is divided into four equal parts, the deepest portion of the concave portion 115 may exist in a section including both ends of the second section from below, or may exist in a section including the upper end of the second section from above. By arranging a plurality of the structural layer units 12 in a direction opposite to the direction described so far and disposing the intermediate layer 20 and the upper layer 30 on top of the structural layer units, there is an effect that the walking surface becomes continuous, the unevenness is less likely to be felt, and the walking performance is enhanced while the same impact absorbing ability is maintained.

The coupling body 40 has a function of connecting the structural layer units 12 to each other and preventing the structural layer units from being displaced even when a load is applied so as not to lose the walking performance and the impact absorption performance. The coupling body 40 is disposed so as to be in physical contact with the column portions 114 of one or more structure bodies 11 respectively existing in the two or more structural layer units 12, and when the column portions 114 are bent, the column portions 114 of the structure bodies 11 existing in the adjacent structural layer units 12 act to support through the coupling body 40. When the coupling body 40 is installed, the lower surface of the coupling body 40 is in contact with the installation portion 111, or the inner side of the lower surface of the coupling body 40 is in contact with the column portion 114.

The coupling body 40 has a function of connecting the structural layer units 12 to each other and preventing the structural layer units from being displaced even when a load is applied so as not to lose the walking performance and the impact absorption performance. The coupling body 40 is disposed so as to be in physical contact with the column portions 114 of one or more structure bodies 11 respectively existing in the two or more structural layer units 12, and when the column portions 114 are bent, the column portions 114 of the structure bodies 11 existing in the adjacent structural layer units 12 act to support through the coupling body 40.

One example of the coupling body 40 of the present embodiment is illustrated in FIG. 10. The coupling body 40 illustrated in FIG. 10 has a structure in which four holes are opened, and for example, when two square structural layer units illustrated in FIG. 9 are arranged vertically and two square structural layer units 12 are arranged horizontally, a total of four square structural layer units are arranged, one structure body 11 at each corner is installed so as to be fitted into each hole. As a result, although the four structural layer units 12 are independent from each other, when a load is applied to a certain structural layer unit 12 due to walking, or the like and a force is applied in the horizontal direction, the force is dispersed to the structure body 11 constituting the adjacent structural layer unit 12 through the coupling body 40, which leads to prevention of deviation of the structural layer unit 12 itself. According to this principle, if the four structural layer units 12 are coupled by the coupling body 40 using the structure bodies 11 forming the corners of the adjacent structural layer units 12, it is possible to create a situation in which the structural layer units 12 are hardly displaced in the range where the structural layer units 12 are laid. In the coupling body 40, a width w41 is about 2 times as long as the width w1, and a width w42 is a length that satisfies Expression 4. When the coupling body 40 is installed in the structural layer unit 12, the height h41 may be set such that a part of the coupling body 40 is not higher than the surface 112a. Note that a structure including only the outer frame of the coupling body 40 illustrated in FIG. 10, such as "o" in katakana, may be used.

$$\text{WIDTH } w2 < \text{WIDTH } w42 < \text{WIDTH } w1 \qquad \text{(Expression 4)}$$

Although the description has been given of coupling the four structural layer units 12 by the coupling body 40 as an example, in order to couple two adjacent structural layer units 12 by the same principle, the coupling body 40 having two holes may exist, or the three structural layer units 12 may be coupled by the coupling body 40 having three holes. In the case of the structural layer unit 12 having the structure as illustrated in FIG. 12, the protruding structure bodies 11 may be coupled by a coupling body 40 having a plurality of holes, or for example, a force applied in the horizontal direction may be dispersed by a structure having a vertical axis and a horizontal axis such as alphabets "H", "S", and "T".

The coupling body 40 needs to have hardness enough to suppress movement of the structural layer unit 12 through the column portion 114 of the structure body 11 existing in the adjacent structural layer unit 12 through the coupling body 40 when the column portion 114 is bent, and is made of, as an example, resin, plastic, wood, metal, or the like.

The intermediate layer 20 is disposed on top of the structural layer 10 to eliminate the unevenness caused by the groove existing in the structural layer 10, thereby preventing deterioration in walking performance. The intermediate layer 20 is responsible for main impact absorbing ability during normal walking, and needs to have a thickness and hardness for about 1 mm sinking in total at the structural layer 10 and the intermediate layer 20 when a load during walking is applied, but 80% or more of sinking is responsible by the intermediate layer 20. The intermediate layer 20 is in contact with the upper surface portions 112 of the plurality of structure bodies 11, and has a function of dispersing a load on the structural layer 10 to several structure bodies 11 to increase rigidity of the flooring system 1. It is assumed that the intermediate layer 20 is used by being adhered to the upper surface portion 112 of the structure body 11, but the present invention is not limited thereto.

The intermediate layer 20 is made of an impact buffering material, and may be, for example, various foaming agents such as a resilient urethane foam, a rubber sponge, polyurethane, a gel that absorbs impact, or the like.

The object may be achieved by disposing the intermediate layer 20 so as to fill the groove formed by the plurality of structure bodies 11 existing in the structural layer 10 without disposing the intermediate layer on top of the structural layer 10. In this case, if the intermediate layer 20 is formed of a material having the same degree of rigidity and resilience as the material forming the structure body 11, when a load is applied to a certain structure body 11, the force is dispersed to the adjacent structure body 11 through the intermediate layer 20. In this case, it is also possible to disperse the force to the adjacent structural layer unit 12 without using the coupling body 40, and a case where the coupling body 40 is not essential is also assumed. In this case, the intermediate layer 20 is slightly higher than the upper surface portion 112 after being installed in the structure body 11, and unevenness is not seen at a glance when the upper layer 30 is disposed. This makes it possible to exhibit impact absorption performance during normal walking. As the intermediate layer 20, one disposed on the structural layer 10 and one disposed so as to fill the groove may be used in combination.

Since the upper layer 30 is a walking surface and is directly exposed to the surface, the upper layer may have functions of anti-slip properties, fire resistance, water resistance, scratch resistance, maintenance properties, and the like in addition of feeling as a contact surface, constant durability for repeated walking, installation of articles, and the like, and designability according to the design of the installation location and the preferences of the purchaser.

The upper layer 30 is made of a hard material having the above-described functions capable of withstanding deformation at the time of falling impact, and may be, for example, a material such as a cushion floor, a tile, a carpet, a cork, or a long sheet made of wood, plywood, stone, vinyl chloride, or the like.

Note that the intermediate layer 20 and the upper layer 30 may be integrated. For example, some commercially available floorings, tile carpets, and the like may have both the functions of the intermediate layer 20 and the upper layer 30, and these may be disposed on top of the structural layer 10. As described above, the flooring of the present invention is highly stable and easy to walk on when walking, while it can exhibit high impact absorbing ability when falling.

EXAMPLES (Flooring Unit Used in Test)

Figure 13A:
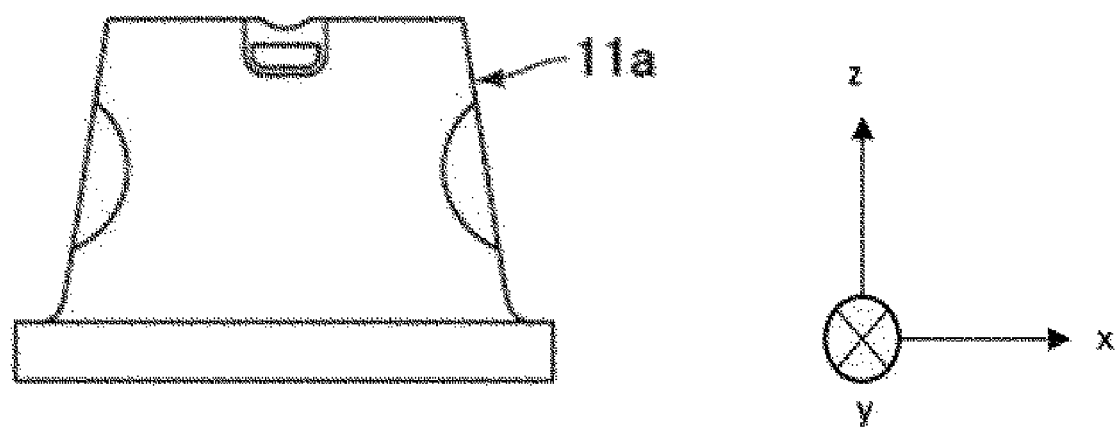
FIG. 13A is a diagram of a structure body 11a used in an example, as viewed directly from a side.
Figure 13B:
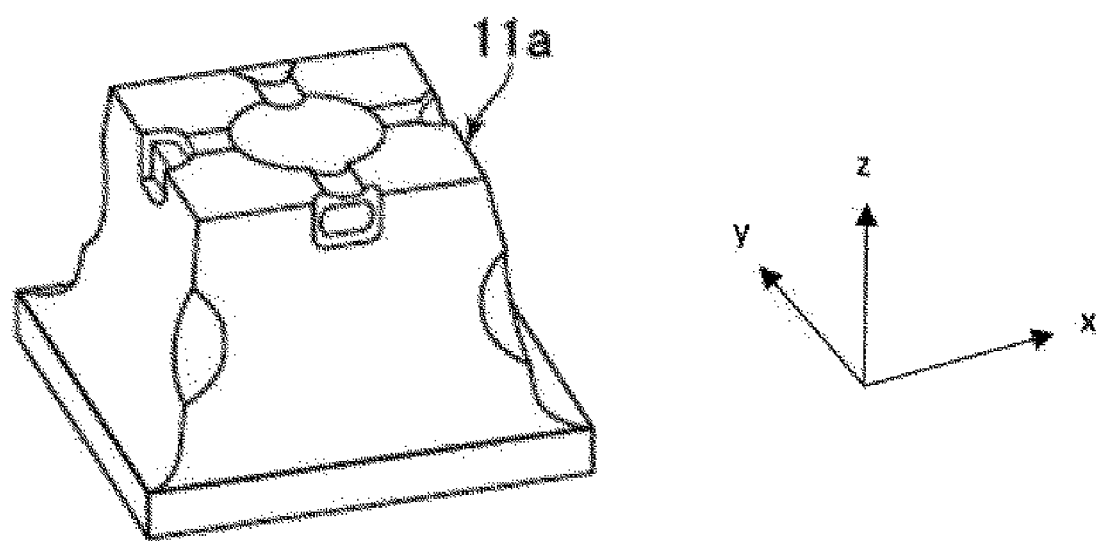
FIG. 13B is a diagram of the structure body 11a used in an example, as viewed obliquely from above.
Figure 13C:
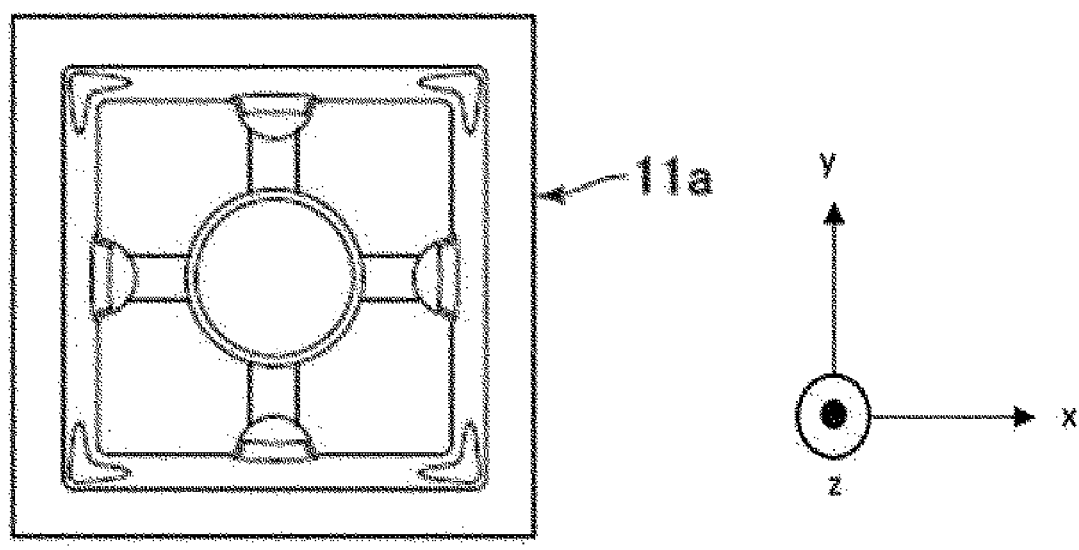
FIG. 13C is a diagram of the structure body 11a used in an example, as viewed directly from above.
Figure 13D:
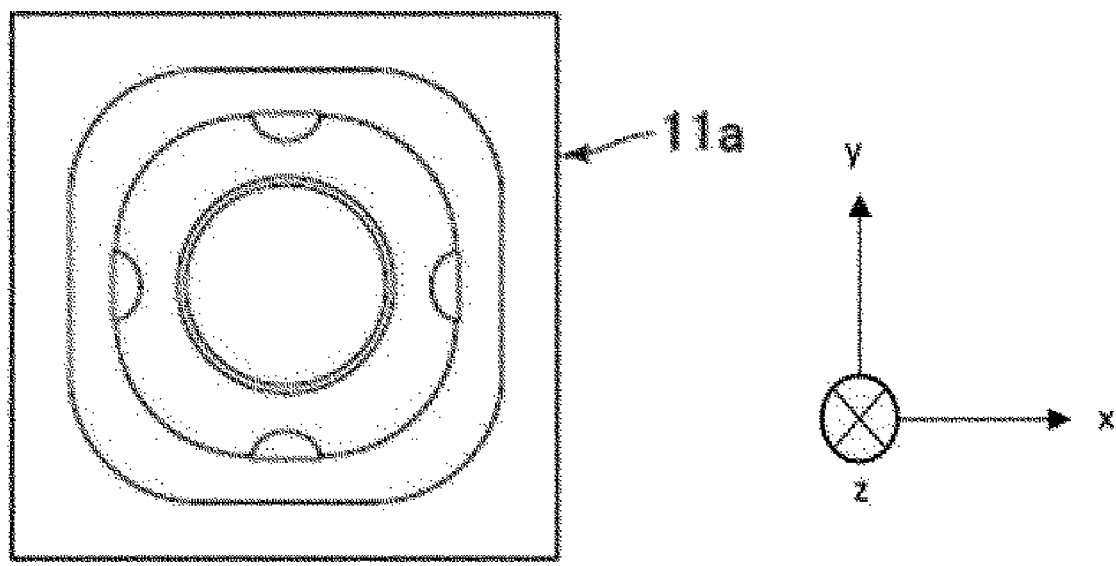
FIG. 13D is a diagram of the structure body 11a used in an example, as viewed directly from below.
Figure 14:
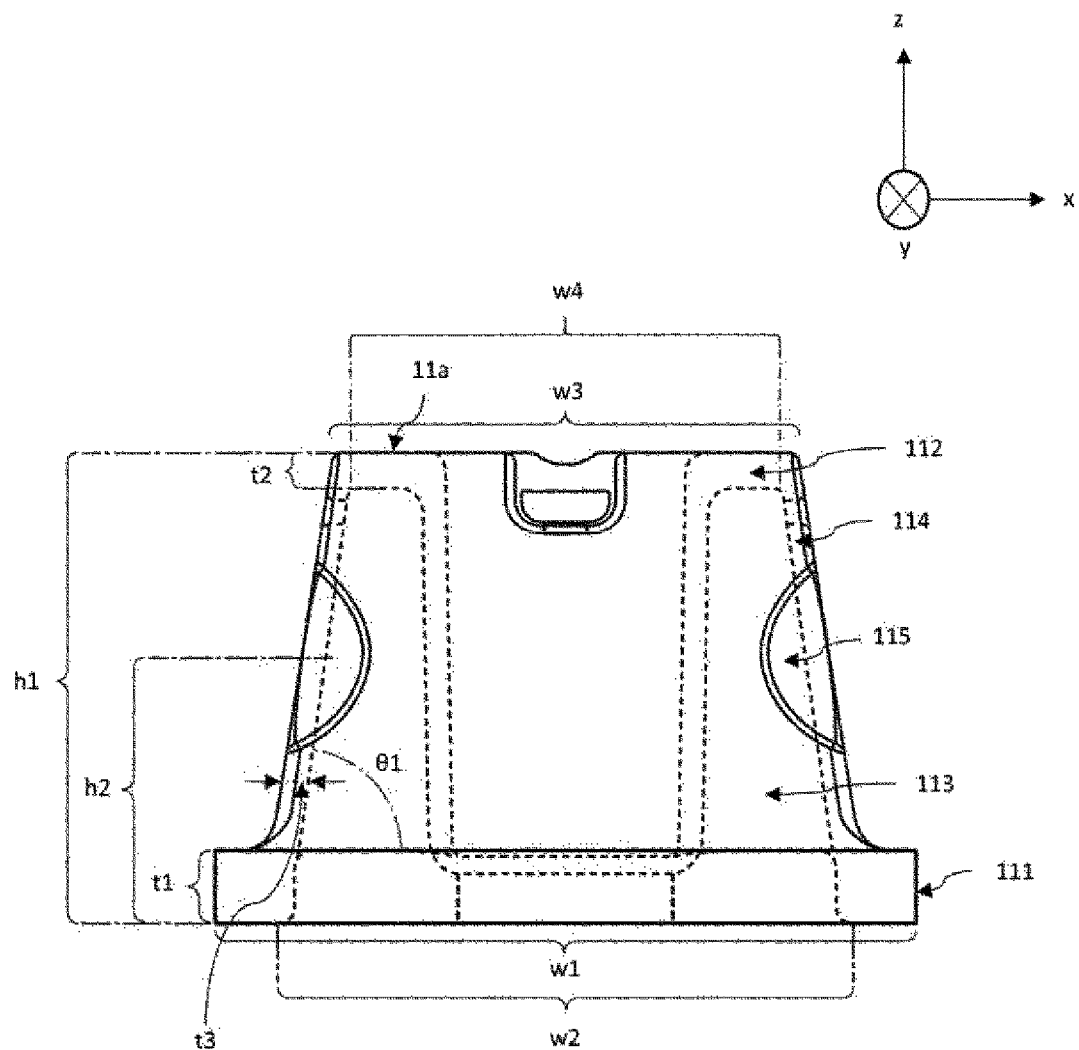
FIG. 14 is another diagram illustrating the structure of the structure body 11a used in an example.

FIGS. 13A to 13D illustrates a structure body 11a as the structure body 11 used in the test. FIG. 13A is a diagram of the structure body 11a as viewed directly from a side. FIG. 13B is a diagram of the structure body 11a as viewed obliquely from above. FIG. 13C is a diagram of the structure body 11a as viewed directly from above. FIG. 13D is a diagram of the structure body 11a as viewed directly from below. The column portion 14 of the structure body 11a is illustrated in FIG. 14. Note that the structural layer unit 12 formed by the structure body 11a is referred to as a structural layer unit 12a.

A numerical value of each portion of the structure body 11a is described as follow. In FIG. 14, the width w1 is 30 mm, the width w2 is 23 mm, the width w3 is 20 mm, the width w4 is 18 mm, the width w5 is 1 mm, the height h1 is 20 mm, the height h2 is 10 mm, the thickness t1 is 3 mm, the thickness t2 is 1.5 mm, the thickness t3 is 1 mm, and the width L1 is 5 mm. The material is made of a thermoplastic elastomer. The structural layer unit 12a is manufactured in a square shape in which ten structure bodies 11a are disposed on one side. The structural layer unit 12a has a width of 300 mm and a height of 20 mm which is the same as the height h1.

As the intermediate layer 20, a sponge containing PVC having a thickness of 4.5 mm is used.

As the upper layer 30, a long sheet having a soft vinyl layer with a thickness of 2 mm is used.

Figure 16:
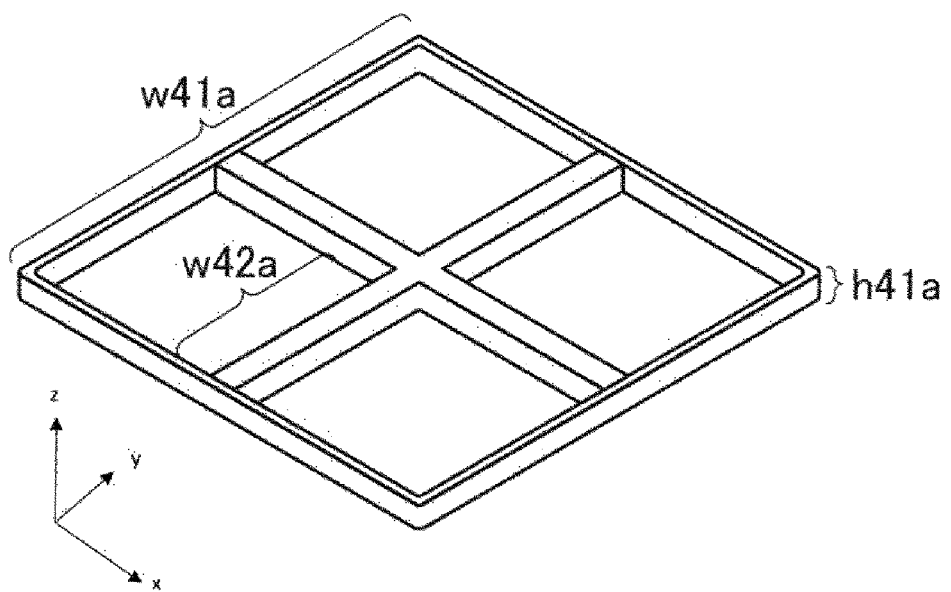
FIG. 16 is a diagram illustrating the structure of the coupling body 40 used in an example.

The structure of the coupling body 40 used in the test is illustrated in FIG. 16. The coupling body 40 has a width w41a of 60 mm, a width w42a of 24 mm, a height h41a of 3 mm, and is made of polypropylene.

The coupling body 40 is disposed so as to straddle one structure body 11a at each corner of the four structural layer units 12a, and the structural layer units 12a is connected. The intermediate layer 20 and the upper layer 30 are stacked and fixed in this order to form a test flooring unit 13.

(Test Method)

The test has been designed for the purpose of reproducing a state in which a person with a weight of 40 kg falls from an upright state and strikes the trochanter portion of the femur against the floor.

Figure 17:
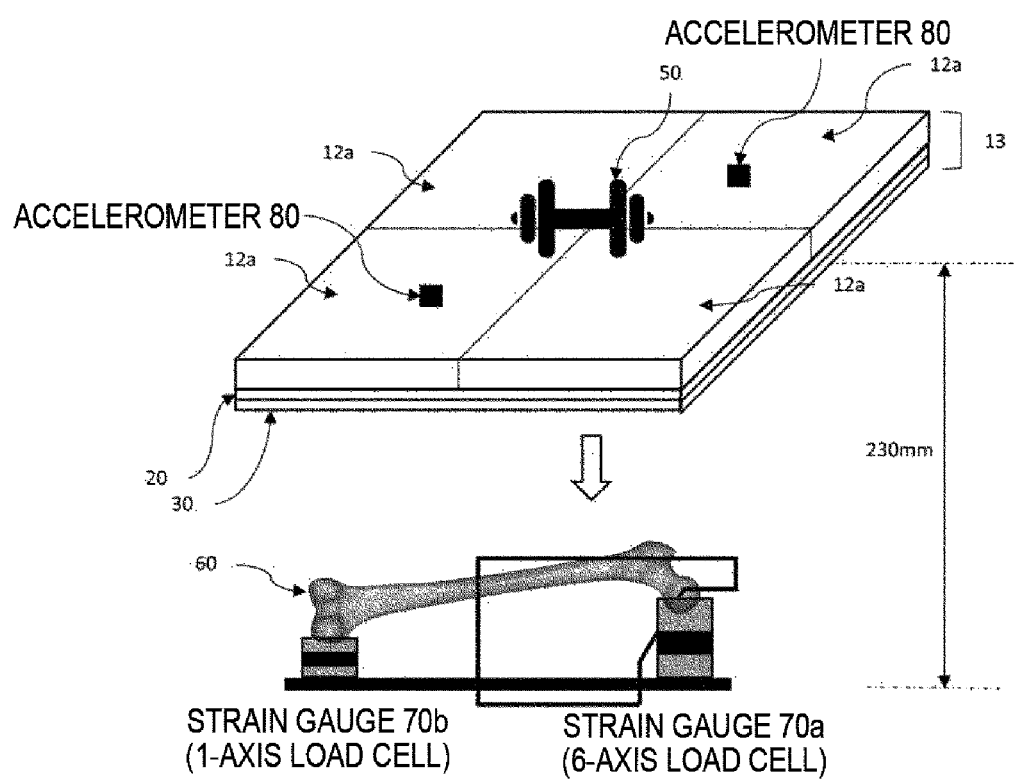
FIG. 17 is a schematic diagram for explaining a test method of an example.

As illustrated in FIG. 17, a weight of 11 kg has been obtained by attaching a jig 50 to the installation portion 111 side of the test flooring unit 13. Accelerometer 80 have been installed at two places separated from the jig 50. The entire test flooring unit 13 to which the jig 50 is attached is turned over and freely dropped from a height of 230 mm. The simulated femur 60 has been installed at a place where the central portion of the test flooring unit 13 falls. A strain gauge 70a (6-axis load cell) and a strain gauge 70b (1-axis load cell) are attached to both the trochanter portion side and the distal end of the simulated femur, and the stress applied to the simulated femur when the test flooring unit 13 falls is measured using the strain gauge 70a and the strain gauge 70b (a proximal load is measured with the strain gauge 70a and a distal load is measured with the strain gauge 70b), and the impact force (N) applied to the simulated femur is measured. Instead of the test flooring unit 13, a general flooring has been used as a control having a low impact absorbing ability, and a similar test has been performed.

Figure 18:
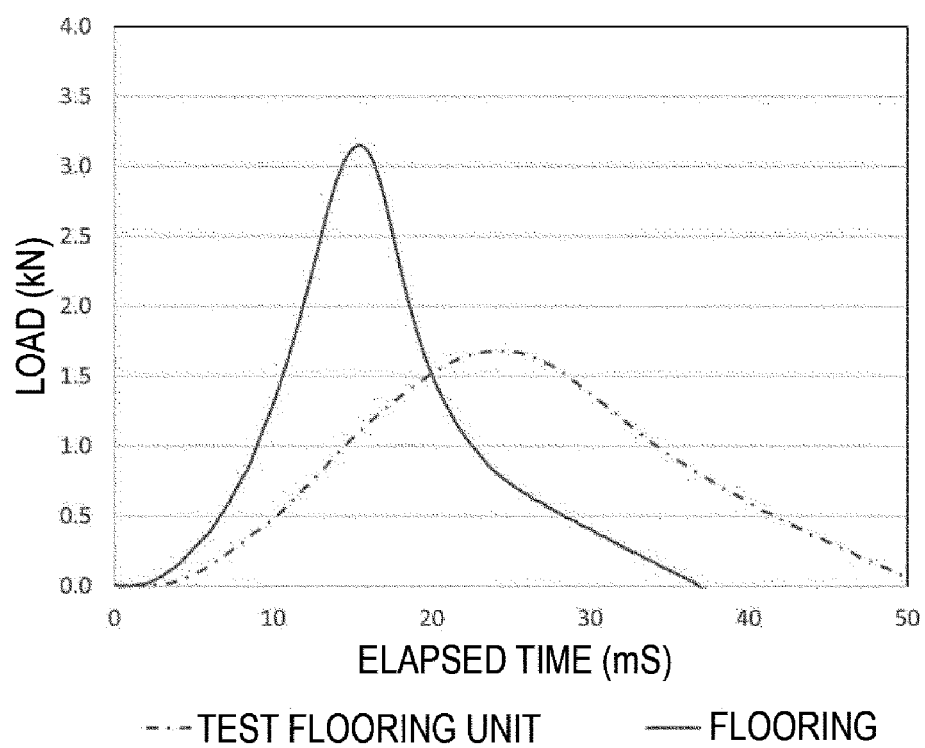
FIG. 18 is a diagram illustrating results of an impact absorption test in an example.

FIG. 18 illustrates the test results of the impact absorbing ability. The horizontal axis represents an elapsed time (mS) from application of an impact to the simulated femur, and the vertical axis represents a load (kN) applied to the simulated femur. In the test using the flooring, the load has exceeded 2000 N from 12 ms after the flooring contacted the simulated femur, the load has exceeded 3000 N and peaked after 14.5 ms, and the load has fallen below 2000 N from 18.5 ms. On the other hand, in the test flooring unit 13, the peak of the load is suppressed after 23 ms, but the value falls significantly below 2000 N, and the load applied to the simulated femur does not exceed 2000 N.

Note that Non-Patent Document 2 reports that the load applied to the femur surface is about 70% of the load applied to the body surface. In Non-Patent Document 3, there is a report that a femur of a 73-year-old male can be broken at about 2000 N.

Non-Patent Document 2: PLoS ONE 13 (8): e0200952.
Non-Patent Document 3: The Journal of Bone and Joint Surgery, vol., 77-A. NO. 3, MARCH 1995

In consideration of the data of Non-Patent Document 2 and Non-Patent Document 3, the results of examples have proved that in flooring, a load that can fracture the femur at the time of falling is applied, and in the test flooring unit 13, impact is absorbed to such an extent that the femur is not fractured at the time of falling. Note that similar data is obtained even when another position of the test flooring unit 13 is brought into contact with the simulated femur, and it can be said that the impact to an extent that the femur is not broken at the time of falling is absorbed at any position of the test flooring unit 13. As described above, the flooring unit used in the test is highly stable and easy to walk on when walking, while it can exhibit high impact absorbing ability when falling.

The above-described embodiments are merely examples for facilitating understanding of the present invention, and are not intended to limit and interpret the present invention. The present invention can be modified and improved without departing from the gist thereof, and it goes without saying that the present invention includes equivalents thereof.

EXPLANATION OF REFERENCES

1: flooring unit
10: structural layer
11: structure body
12: structure body unit
13: test flooring unit
20: intermediate layer
30: upper layer
40: coupling body
50: jig
60: simulated femur
70: strain gauge
80: accelerometer
111: installation portion
112: upper surface portion
113: wall layer
114: column portion
115: concave portion.

What is claimed is:

1. An impact absorbing flooring that reduces an impact caused by falling of a user, the impact absorbing flooring comprising:
   a structural layer having a plurality of impact absorbing structures, each of which has a truncated pyramid-shaped structure and has a recess on a side of the truncated pyramid that is not substantially horizontal to a ground surface, wherein
   a deepest portion of the recess is in a section including both ends of second to fourth sections from above when a height of each of the plurality of impact absorbing structures is divided into four equal parts.

2. The impact absorbing flooring according to claim 1, further comprising, on top of the structural layer:
   an upper layer containing a flooring material that enhances a walking performance of the user; and
   an intermediate layer made of an impact buffering material.

3. The impact absorbing flooring according to claim 1, wherein
   the structural layer is formed by causing a plurality of units to be adjacent to each other, wherein each of the plurality of units comprises two or more of the impact absorbing structures adjacently disposed on one side.

4. The impact absorbing flooring according to claim 3, further comprising, on top of the structural layer:
   an upper layer containing a flooring material that enhances a walking performance of the user; and
   an intermediate layer made of an impact buffering material.

5. The impact absorbing flooring according to claim 3, further comprising:
   a coupling body configured to couple the plurality of the units.

6. The impact absorbing flooring according to claim 5, further comprising, on top of the structural layer:
   an upper layer containing a flooring material that enhances a walking performance of the user; and
   an intermediate layer made of an impact buffering material.

7. The impact absorbing flooring according to claim 5, wherein
   the coupling body is configured to simultaneously touch those of the plurality of the impact absorbing structures respectively existing in the plurality of the units which are adjacent to each other.

8. The impact absorbing flooring according to claim 7, further comprising, on top of the structural layer:
   an upper layer containing a flooring material that enhances a walking performance of the user; and
   an intermediate layer made of an impact buffering material.

9. The impact absorbing flooring according to claim 1, further comprising, on top of the structural layer:
   an upper layer containing a flooring material that enhances a walking performance of the user; and
   an intermediate layer made of an impact buffering material.

10. The impact absorbing flooring according to claim 1, wherein
    the structural layer is formed by causing a plurality of units to be adjacent to each other, wherein each of the plurality of units comprises two or more of the plurality of the impact absorbing structures adjacently disposed on one side.

11. The impact absorbing flooring according to claim 10, further comprising, on top of the structural layer:
    an upper layer containing a flooring material that enhances a walking performance of the user; and
    an intermediate layer made of an impact buffering material.

12. The impact absorbing flooring according to claim 10, further comprising:
    a coupling body configured to couple the plurality of the units.

13. The impact absorbing flooring according to claim 12, further comprising, on top of the structural layer:
    an upper layer containing a flooring material that enhances a walking performance of the user; and
    an intermediate layer made of an impact buffering material.

14. The impact absorbing flooring according to claim 12, wherein
    the coupling body is configured to simultaneously touch those of the plurality of the impact absorbing structures respectively existing in the plurality of the units which are adjacent to each other.

15. The impact absorbing flooring according to claim 14, further comprising, on top of the structural layer:
    an upper layer containing a flooring material that enhances a walking performance of the user; and
    an intermediate layer made of an impact buffering material.

* * * * *